(12) United States Patent
Suciu et al.

(10) Patent No.: US 9,011,076 B2
(45) Date of Patent: Apr. 21, 2015

(54) COUNTER-ROTATING LOW PRESSURE TURBINE WITH GEAR SYSTEM MOUNTED TO TURBINE EXHAUST CASE

(75) Inventors: Gabriel L. Suciu, Glastonbury, CT (US); Brian D. Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 551 days.

(21) Appl. No.: 13/408,281

(22) Filed: Feb. 29, 2012

(65) Prior Publication Data

US 2013/0223992 A1    Aug. 29, 2013

(51) Int. Cl.
| | |
|---|---|
| F01D 15/12 | (2006.01) |
| F02C 7/36 | (2006.01) |
| F02K 3/072 | (2006.01) |
| F01D 1/26 | (2006.01) |
| F01D 1/28 | (2006.01) |

(52) U.S. Cl.
CPC ... F02C 7/36 (2013.01); F01D 1/26 (2013.01); F01D 1/28 (2013.01); F02K 3/072 (2013.01); Y02T 50/671 (2013.01)

(58) Field of Classification Search
CPC ............ F01D 1/26; F01D 1/28; F02K 3/072; F02C 7/36
USPC ......... 415/122.1, 65, 66, 67, 68, 69; 416/122, 416/124, 126, 128, 129, 170 R
See application file for complete search history.

(56) References Cited

U.S. PATENT DOCUMENTS

| | | | |
|---|---|---|---|
| 4,817,382 A | 4/1989 | Rudolph et al. | |
| 4,969,325 A | 11/1990 | Adamson et al. | |
| 5,010,729 A | 4/1991 | Adamson et al. | |
| 5,307,622 A | 5/1994 | Ciokajlo et al. | |
| 6,158,210 A * | 12/2000 | Orlando ...................... | 60/226.1 |
| 6,381,948 B1 | 5/2002 | Klingels | |
| 6,619,030 B1 | 9/2003 | Seda et al. | |
| 6,684,626 B1 | 2/2004 | Orlando et al. | |
| 6,763,652 B2 | 7/2004 | Baughman et al. | |
| 6,763,653 B2 | 7/2004 | Orlando et al. | |
| 6,763,654 B2 | 7/2004 | Orlando et al. | |
| 7,186,073 B2 | 3/2007 | Orlando et al. | |
| 7,451,592 B2 | 11/2008 | Taylor et al. | |
| 7,490,461 B2 | 2/2009 | Moniz et al. | |
| 7,493,754 B2 | 2/2009 | Moniz et al. | |
| 7,716,914 B2 | 5/2010 | Schilling | |
| 7,726,113 B2 | 6/2010 | Orlando et al. | |
| 7,841,165 B2 | 11/2010 | Orlando et al. | |

(Continued)

OTHER PUBLICATIONS

International Search Report and Written Opinion for International Application No. PCT/US2013/026266 completed on Nov. 11, 2013.

(Continued)

*Primary Examiner* — Igor Kershteyn
(74) *Attorney, Agent, or Firm* — Carlson, Gaskey & Olds, PC (57) ABSTRACT

A gas turbine engine includes a shaft defining an axis of rotation. An inner rotor directly drives the shaft and includes an inner set of blades. An outer rotor has an outer set of blades interspersed with the inner set of blades. The outer rotor is configured to rotate in an opposite direction about the axis of rotation from the inner rotor. A gear system couples the outer rotor to the shaft and is configured to rotate the inner set of blades at a lower speed than the outer set of blades.

24 Claims, 5 Drawing Sheets

(56) References Cited

U.S. PATENT DOCUMENTS

| | | |
|---|---|---|
| 7,926,259 B2 | 4/2011 | Orlando et al. |
| 7,950,220 B2 | 5/2011 | Merry et al. |
| 8,015,798 B2 | 9/2011 | Norris et al. |
| 2006/0090451 A1 | 5/2006 | Moniz et al. |
| 2007/0084187 A1* | 4/2007 | Moniz et al. .................. 60/204 |
| 2007/0087892 A1* | 4/2007 | Orlando et al. ............. 475/348 |
| 2007/0240399 A1 | 10/2007 | Orlando et al. |
| 2009/0191045 A1 | 7/2009 | Suciu et al. |
| 2010/0154384 A1 | 6/2010 | Schilling |
| 2011/0206498 A1 | 8/2011 | McCooey |
| 2011/0243735 A1 | 10/2011 | Balk et al. |

OTHER PUBLICATIONS

International Preliminary Report on Patentability for International Application No. PCT/US2013/026266 mailed on Sep. 12, 2014.

* cited by examiner

COUNTER-ROTATING LOW PRESSURE TURBINE WITH GEAR SYSTEM MOUNTED TO TURBINE EXHAUST CASE

BACKGROUND

A typical jet engine has multiple shafts or spools that transmit torque between turbine and compressor sections of the engine. In one example, a low speed spool generally includes a low shaft that interconnects a fan, a low pressure compressor, and a low pressure turbine. In order to achieve a desirable high pressure core ratio, a long low shaft is required. In contrast, to increase an engine's power density, there is a countering goal of shortening the overall engine length. Thus, historically these two concepts have been at odds.

SUMMARY

In one exemplary embodiment, a gas turbine engine includes a shaft defining an axis of rotation, a turbine section, and a gear system. The turbine section includes: (a) an inner rotor that directly drives the shaft and that includes an inner set of blades; and (b) an outer rotor that has an outer set of blades interspersed with the inner set of blades. The outer rotor is configured to rotate in an opposite direction about the axis of rotation from the inner rotor. The gear system couples the outer rotor to the shaft and is configured to rotate the inner set of blades at a lower speed than the outer set of blades.

In a further embodiment of the above, the gear system is mounted to a turbine exhaust case.

In a further embodiment of any of the above, the gear system includes a sun gear engaged to the outer rotor, a plurality of star gears in meshing engagement with the sun gear, and a ring gear in meshing engagement with the star gears.

In a further embodiment of any of the above, the sun gear is fixed for rotation with an aft end of the outer rotor.

In a further embodiment of any of the above, the star gears are supported within a carrier that is fixed to the turbine exhaust case.

In a further embodiment of any of the above, an aft end of the shaft includes a portion that extends radially outward from the axis to be coupled to the ring gear.

In a further embodiment of any of the above, a first bearing supports a fore end of the outer rotor for rotation relative to a mid-turbine frame structure and a second bearing supports an aft end of the outer rotor for rotation relative to the shaft.

In a further embodiment of any of the above, a third bearing supports the shaft for rotation relative to the mid-turbine frame structure.

In a further embodiment of any of the above, the first and third bearings are generally radially aligned with each other relative to the axis of rotation.

In a further embodiment of any of the above, a low pressure turbine static case has an aft end connected to the turbine exhaust case and a fore end connected to a mid-turbine frame case.

In a further embodiment of any of the above, a fore end of the shaft is associated with a counter-rotating low pressure compressor.

In another exemplary embodiment, a gas turbine engine comprises a core air flowpath and a shaft supporting a compressor section and a turbine section arranged within the core flow path. The turbine section includes a counter-rotating low pressure turbine comprising an inner rotor directly driving the shaft and having an inner set of blades and an outer rotor having an outer set of blades interspersed with the inner set of blades. The outer rotor is configured to rotate in an opposite direction about the axis of rotation from the inner rotor. A gear system couples the outer rotor to the shaft and is configured to rotate the inner set of blades at a lower speed than the outer set of blades.

In a further embodiment of any of the above, the compression section includes a high pressure compressor section that has a pressure ratio of approximately 23:1.

In a further embodiment of any of the above, the compressor section includes a counter-rotating low pressure compressor driven by the shaft.

In a further embodiment of any of the above, the gear system is mounted to a turbine exhaust case.

In a further embodiment of any of the above, the gear system includes a sun gear engaged to the outer rotor, a plurality of star gears in meshing engagement with the sun gear, and a ring gear in meshing engagement with the star gears.

In a further embodiment of any of the above, the sun gear is fixed for rotation with an aft end of the outer rotor, the star gears are supported within a carrier that is fixed to the turbine exhaust case, and an aft end of the shaft includes a portion that extends radially outward from the axis to be coupled to the ring gear.

In a further embodiment of any of the above, a first bearing supports a fore end of the outer rotor for rotation relative to a mid-turbine frame structure, a second bearing supports an aft end of the outer rotor for rotation relative to the shaft, and a third bearing supports the shaft for rotation relative to the mid-turbine frame structure.

In a further embodiment of any of the above, the first and third bearings are generally radially aligned with each other relative to the axis of rotation.

In a further embodiment of any of the above, the first and third bearings are roller bearings and the second bearing is a ball bearing.

BRIEF DESCRIPTION OF THE DRAWINGS

The disclosure can be further understood by reference to the following detailed description when considered in connection with the accompanying drawings wherein.

DETAILED DESCRIPTION

Figure 1:
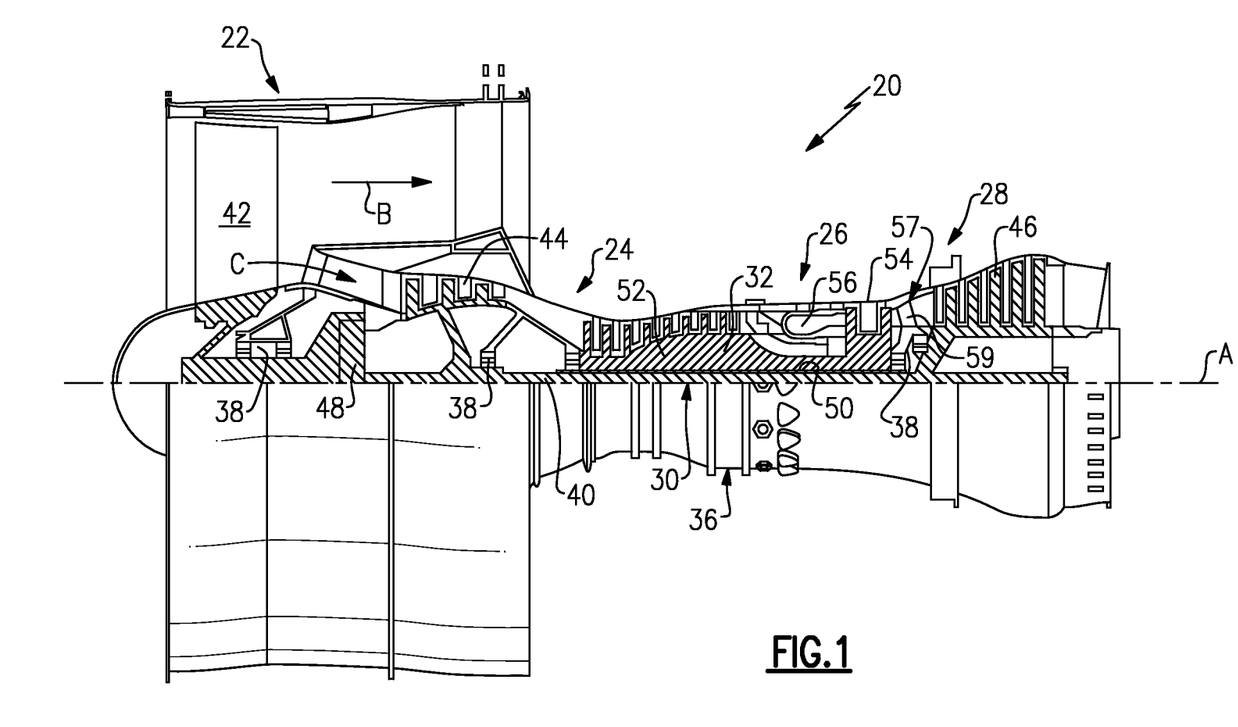
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second.

Figure 2:
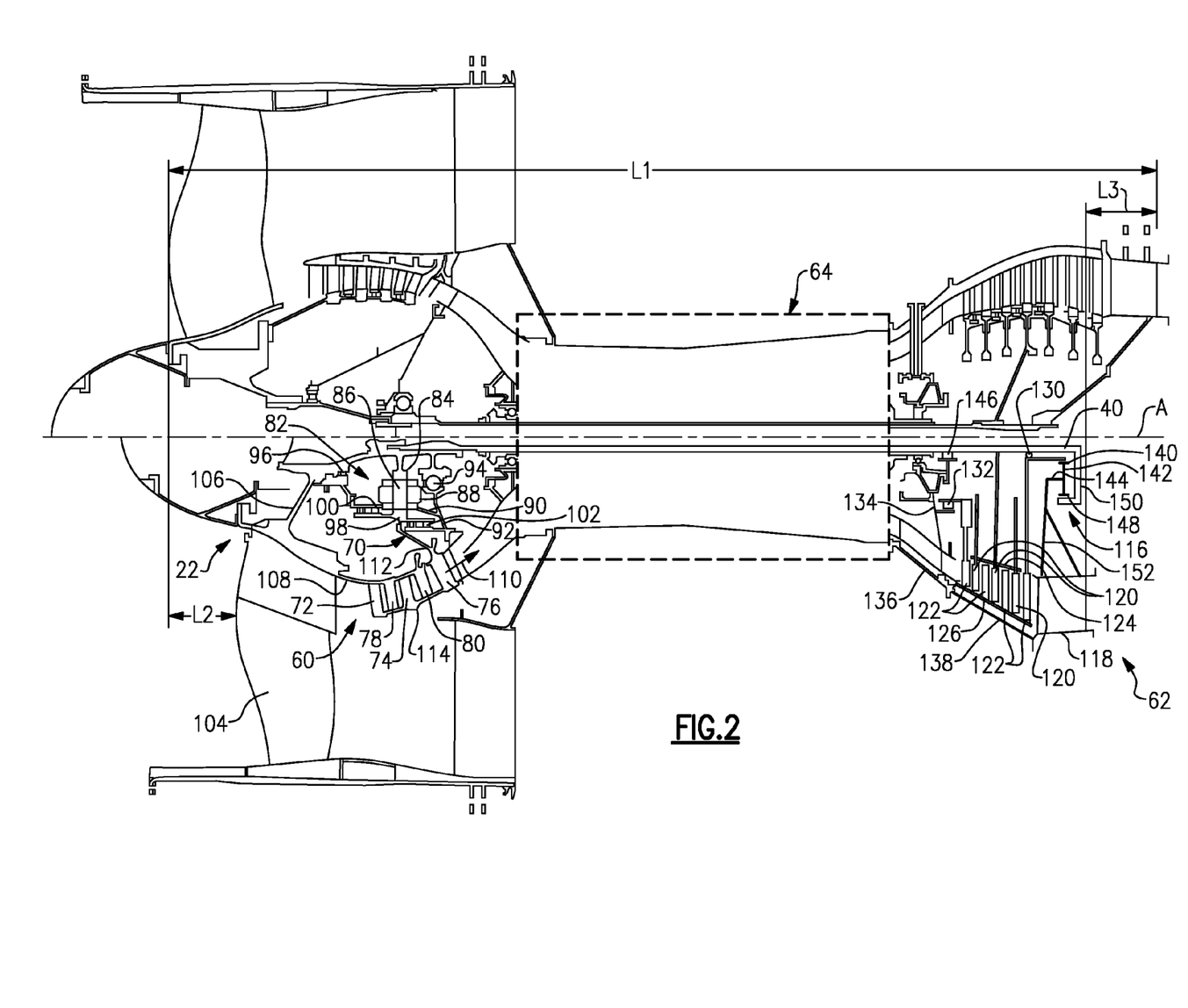
FIG. 2 is a cross-sectional view of an engine upper half showing an example of a non-counter-rotating configuration and an engine lower half showing an embodiment of a counter-rotating low pressure compressor architecture and counter-rotating low pressure turbine architecture of a gas turbine engine.
Figure 3:
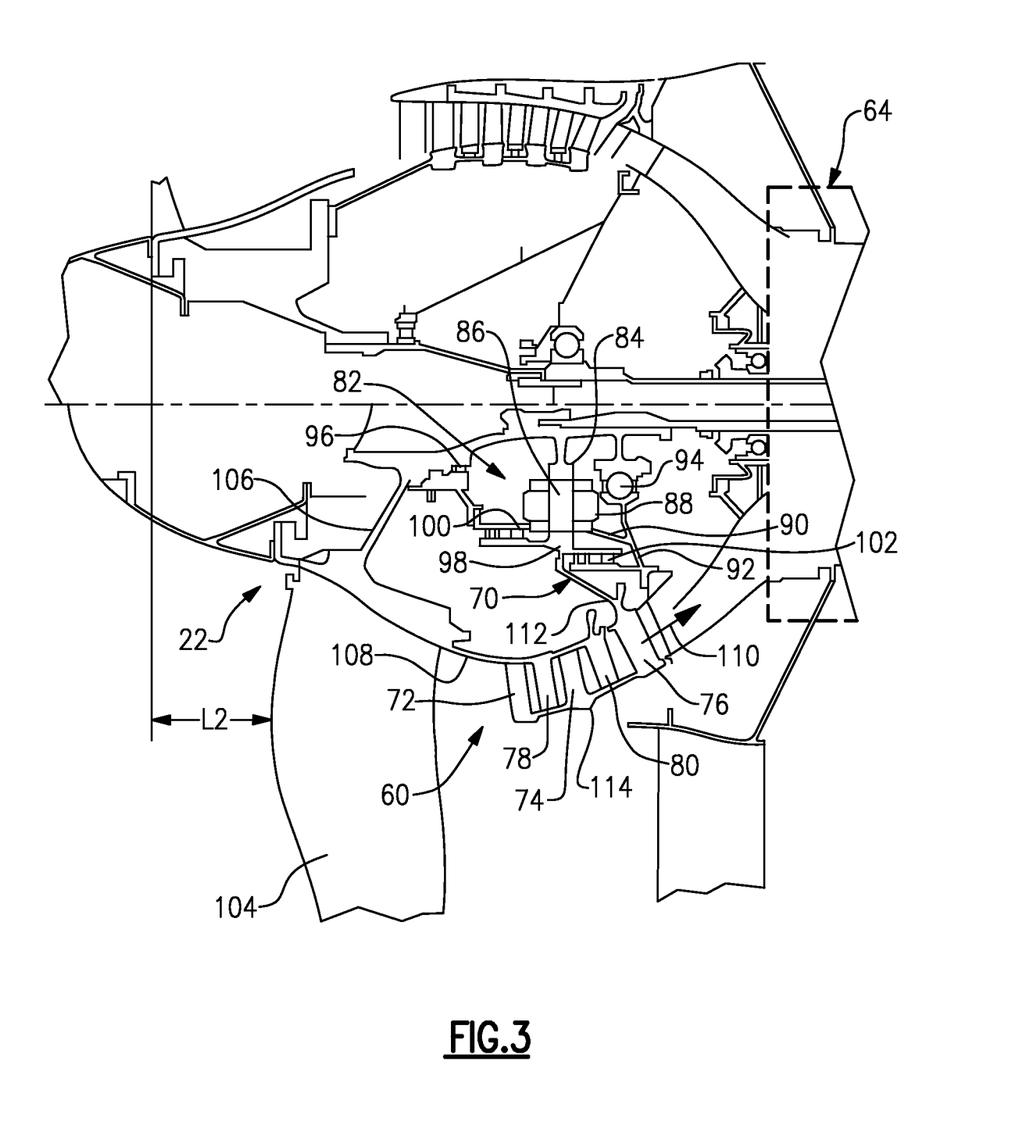
FIG. 3 shows an enlarged view of the low pressure compressor shown in FIG. 2.

Referring to FIGS. 2 and 3, a geared turbofan architecture with a counter-rotating low pressure compressor (LPC) 60 and counter-rotating low pressure turbine (LPT) 62 is provided, which significantly reduces a length of the low speed or inner shaft 40 as compared to a non-counter-rotating configuration, an example of which is shown in FIG. 1 and in the upper half of FIG. 2. This non-rotating configuration in the upper half of FIG. 2 is included for the purposes of a length comparison to the counter-rotating LPC and counter-rotating LPT configurations shown in the lower half of FIG. 2. The engine has a high pressure core, schematically indicated at 64. It is to be understood that the high pressure core 64 includes the combustor 56 and the high spool 32 (i.e., the high pressure compressor 52, the high pressure turbine 54, and the high shaft 50) shown in FIG. 1. The high pressure compressor 52 has a high pressure core ratio of 23:1, for example. To retain this ratio, as well as providing a desired low shaft diameter and speed, a combination of the counter-rotating LPC 60 and LPT 62 is utilized as shown in the lower half of FIG. 2.

One example of the LPC 60 is found in U.S. Pat. No. 7,950,220, which is assigned to the same assignee as the subject invention, and which is hereby incorporated by reference. In this example, which is shown in FIG. 2, the LPC 60 includes a counter-rotating compressor hub 70 with blade stages 72, 74, and 76 interspersed with blade stages 78 and 80 of the low speed spool 30. The counter-rotating compressor hub 70 may be driven by a transmission 82. The transmission 82 is also schematically illustrated in FIG. 5. In one example, the transmission 82 is an epicyclic transmission having a sun gear 84 mounted to the low shaft 40. A circumferential array of externally-toothed star gears 86 are in meshing engagement with the sun gear 84. The star gears 86 are carried on journals 88 carried by a carrier 90. The carrier 90 is fixedly mounted relative to an engine static structure 92. The static structure 92 is coupled to the low shaft 40 via multiple bearing systems 94 and 96 to permit rotation of the low shaft 40.

Figure 5:
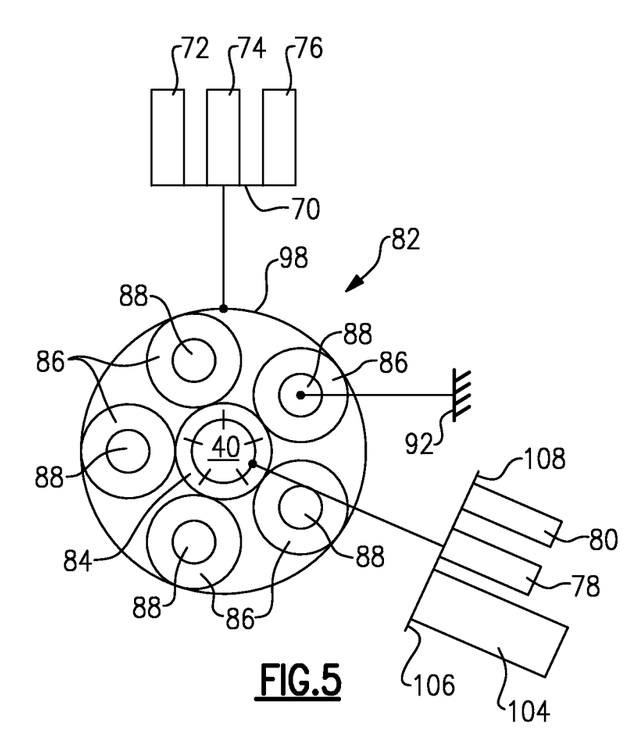
FIG. 5 shows a schematic view of the lower pressure compressor shown in FIG. 2.

The transmission 82 further includes an internally-toothed ring gear 98 encircling and in meshing engagement with the star gears 86. The ring gear 98 is supported relative to the static structure 92 by one or more bearing systems 100 and 102. The transmission 82 causes a counter-rotation of ring gear 98. As the compressor hub 70 is engaged with the ring gear 98, the transmission 82 causes a counter-rotation of the compressor hub 70 (and blades 72, 74, 76) relative to the low speed spool 30. Fan blades 104 of the fan section 22 are mounted via a hub 106 to the low shaft 40. In addition, and low pressure compressor blades 78, 80 are also mounted to the hub 106 via a blade platform ring 108. As a result of the foregoing, the fan blades 104 and the low pressure compressor blades 78, 80 co-rotate with the low shaft 40.

An outboard surface of the platform ring 108 locally forms an inboard boundary of a core flowpath 110. The blades of stages 78 and 80 extend from inboard ends fixed to the platform ring 108 to free outboard tips. In the example shown, the blades of the downstreammost stage 76 of the hub 70 are mounted to an outboard end of a support 112. The outboard ends of the blades of the stage 76 are secured relative to a shroud ring 114. An inboard surface of the shroud ring 114 forms a local outboard boundary of the core flowpath 110. The outboard ends of the blades of the stages 72 and 74 are mounted to the shroud ring 114. The support 112 is affixed to the ring gear 98 to drive rotation of the blades of stage 76 and, through the shroud ring 114, the blades of stages 72 and 74.

As shown in the upper half of FIG. 2, in one typical non-counter-rotating configuration, the engine 20 without a counter-rotating compressor or turbine has an overall length L1 defined from a foremost surface of the fan blade 104 to an aftmost end of a turbine exhaust case 118. The LPC configuration 60 provides a length reduction L2 by utilizing a counter-rotating compressor architecture. The LPT configuration 62 provides another length reduction L3 by utilizing a counter-rotating turbine architecture. One example of a LPT is found in United States Publication No. 2009/0191045 A1, which is assigned to the same assignee as the subject invention, and which is hereby incorporated by reference.

Figure 4:
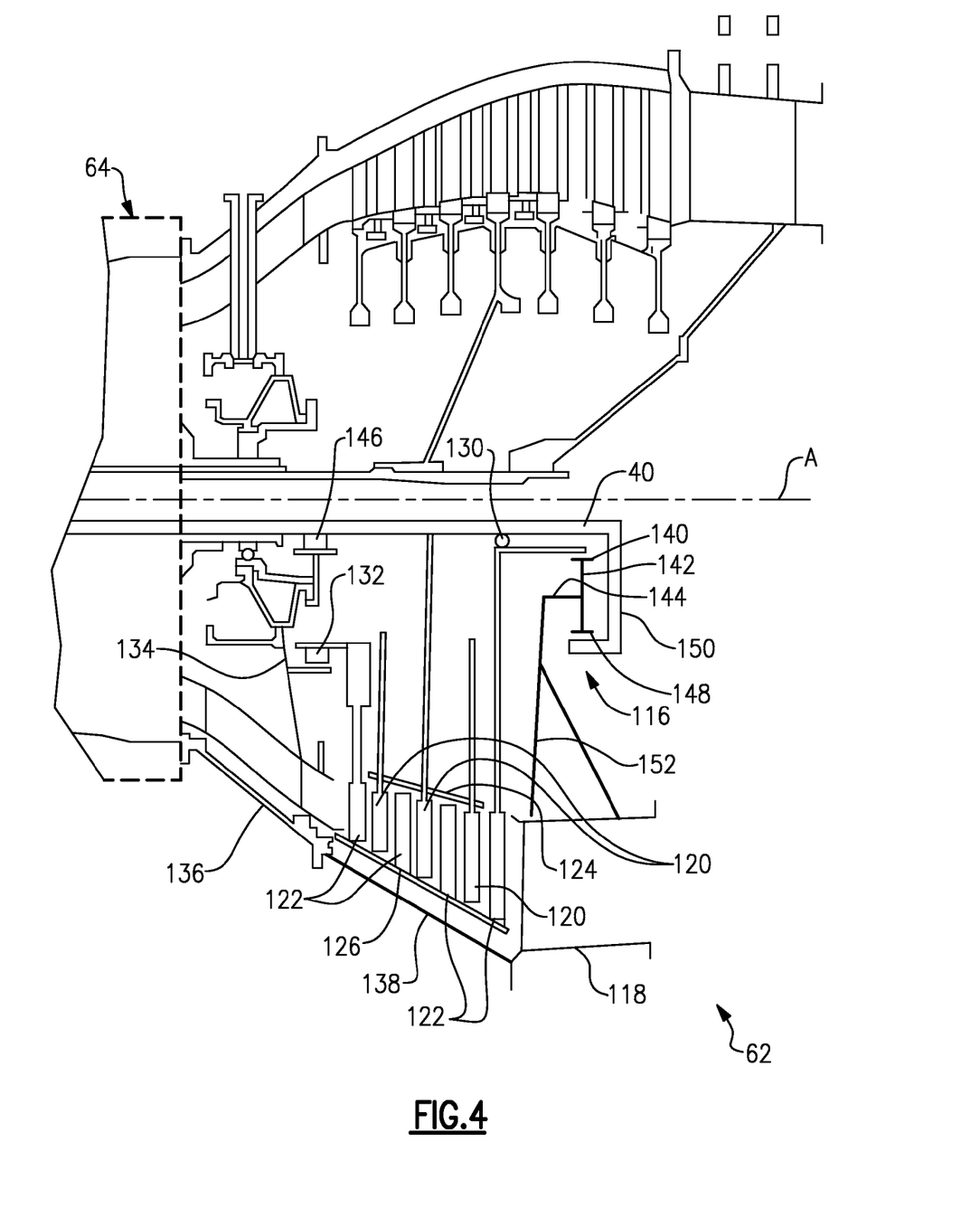
FIG. 4 shows an enlarged view of the low pressure turbine shown in FIG. 2.

FIGS. 2 and 4 show another example of a LPT 62 having a counter-rotating configuration with a gear system 116 mounted to the turbine exhaust case 118, which contributes to the overall amount of length reduction L3 by shortening the LPT static case portion. In this example, the LPT 62 has an inner set of blades 120 that are directly coupled to the low shaft 40 and an outer set of blades 122 interspersed with the inner set of blades 120. The outer set of blades 122 rotates in an opposite direction about the axis A as compared to the inner set of blades 120.

The inner set of blades 120 are fixed to an inner rotor 124 that directly drives the low shaft 40, i.e. the low shaft 40 and inner set of blades rotate at a common speed. The outer set of blades 122 are fixed to an outer rotor 126 that drives the gear system 116. Bearings 130, 132 rotatably support the outer rotor 126. Bearing 130 supports an aft end of the rotor 126 for rotation relative to the low shaft 40, while bearing 132 supports a fore end of the rotor 126 for rotation relative to a mid-turbine frame 134. In one example, the aft bearing 130 is a ball bearing and the fore bearing 132 is a roller bearing. In one example configuration, the shaft bearing 146 and the fore bearing 132 for the outer rotor 126 are radially aligned with each other in a direction extending radially away from the axis A. The shaft bearing 146 is radially inward of the fore bearing 132. In one example, both bearings 132, 146 are roller bearings. The mid-turbine frame 134 comprises a static structure that extends to an outer case portion 136. The outer case portion 136 is attached to a LPT static case 138, which surrounds the inner 120 and outer 122 sets of blades.

Figure 6:
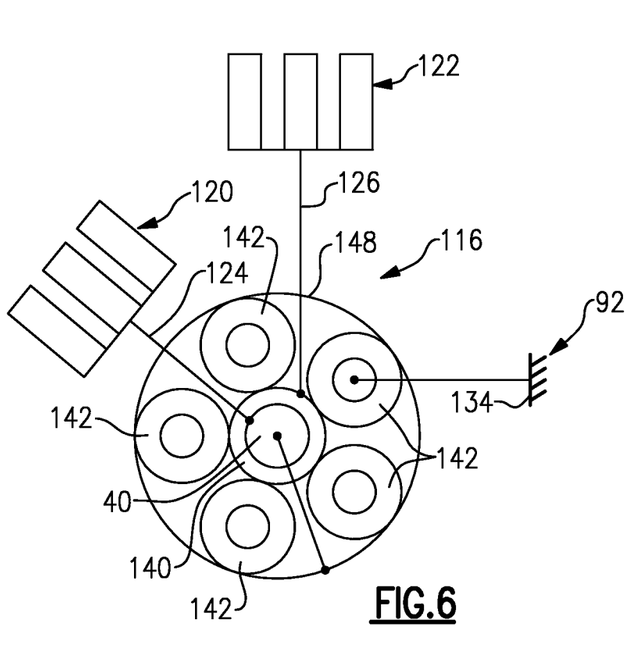
FIG. 6 shows a schematic view of the lower pressure turbine shown in FIG. 2.

As shown in FIG. 6, the gear system 116 includes a sun gear 140 that is driven by the outer rotor 126. The inner rotor 124 is coupled to the low shaft 40. A circumferential array of externally-toothed star gears 142 are in meshing engagement with the sun gear 140. The star gears 142 are supported by a carrier 144 (FIG. 4) that is fixed to the turbine exhaust case 118. A bearing 146 supports the low shaft 40 for rotation relative to the mid-turbine frame 134.

A ring gear 148 is in meshing engagement with the star gears 142. The aft end of the rotor 126 drives the sun gear 140. In the example shown in FIGS. 2 and 4, the low shaft 40 includes a portion 150 that extends in a radial direction away from the axis A. This portion 150 is configured to be driven by the ring gear 148. Thus, the inner set of blades 120 is driven at a lower speed than the outer set of blades 122. In one example, the gear system has a ratio within a range of between about 0.5:1 and about 5.0:1.

In this configuration, the gear system 116 is downstream of the LPT 62. Specifically, the gear system 116 is positioned aft of the interspersed blades 120, 122 and is surrounded by the turbine exhaust case 118. The carrier 144 for the star gears 142 is fixed to the turbine exhaust case 118 via at least one strut 152. This counter-rotating configuration allows the overall length of the LPT static case 138 to be shortened compared to a non-counter-rotating configuration. This results in a weight reduction as well as contributing to the desired length reduction L3. Further, the gear drive is at a cooler location than if it were mounted to the mid-turbine frame. Other advantages of placing the gear system 116 within the turbine exhaust case 118 include providing greater strut areas for mounting and oil flow, in addition to providing scavenging, buffer air, and better serviceability.

The low shaft 40 receives a portion of the overall driving input directly from the inner set of blades 120 and a remaining portion of the overall driving input is provided by the outer set of blades 122 via the gear system 116. The outer set of blades 122 is configured to rotate at a faster speed and in an opposite direction from the inner set of blades 120. Spinning the outer set of blades 122 at a higher speed takes advantage of the existing turbine disks' ability to handle higher speeds. This configuration provides a geared turbofan architecture with a long, slow turning low shaft 40, which enables the use of a high pressure ratio core. Further, this configuration provides for significant length reduction as compared to prior configurations.

It should be understood that the LPC 60 described above is just one example configuration, and that the LPT 62 described above could be utilized with various other LPC configurations. Further, the LPT 62 could also be used in a configuration that does not include a counter-rotating LPC.

As a result of the foregoing improvements, an engine has been invented that includes both a desirable high pressure core ratio, while at the same time reducing the overall engine length, thereby maximizing the engine's power density.

Although an example embodiment has been disclosed, a worker of ordinary skill in this art would recognize that certain modifications would come within the scope of the claims. For that reason, the following claims should be studied to determine their true scope and content.

What is claimed is:

1. A gas turbine engine comprising:
   a shaft defining an axis of rotation;
   a turbine section comprising:
      an inner rotor directly driving the shaft, the inner rotor including an inner set of blades; and
      an outer rotor having an outer set of blades interspersed with the inner set of blades, the outer rotor configured to rotate in an opposite direction about the axis of rotation from the inner rotor; and
   a gear system coupling the outer rotor to the shaft and configured to rotate the inner set of blades at a lower speed than the outer set of blades.

2. The gas turbine engine according to claim 1, wherein the gear system is mounted to a turbine exhaust case.

3. The gas turbine engine according to claim 2, wherein the gear system includes a sun gear engaged to the outer rotor, a plurality of star gears in meshing engagement with the sun gear, and a ring gear in meshing engagement with the star gears.

4. The gas turbine engine according to claim 3, wherein the sun gear is fixed for rotation with an aft end of the outer rotor.

5. The gas turbine engine according to claim 3, wherein the star gears are supported within a carrier that is fixed to the turbine exhaust case.

6. The gas turbine engine according to claim 3, wherein an aft end of the shaft includes a portion that extends radially outward from the axis to be coupled to the ring gear.

7. The gas turbine engine according to claim 2, including a first bearing supporting a fore end of the outer rotor for rotation relative to a mid-turbine frame structure and a second bearing supporting an aft end of the outer rotor for rotation relative to the shaft.

8. The gas turbine engine according to claim 7, including a third bearing supporting the shaft for rotation relative to the mid-turbine frame structure.

9. The gas turbine engine according to claim 8, wherein the first and third bearings are generally radially aligned with each other relative to the axis of rotation.

10. The gas turbine engine according to claim 2, including a low pressure turbine static case having an aft end connected to the turbine exhaust case and a fore end connected to a mid-turbine frame case.

11. The gas turbine engine according to claim 1, wherein a fore end of the shaft is associated with a counter-rotating low pressure compressor.

12. The gas turbine engine according to claim 1, wherein the gear system is positioned downstream of the inner and outer sets of blades.

13. The gas turbine engine according to claim 1, wherein the gear system includes a sun gear directly driven by the outer rotor, a plurality of star gears in meshing engagement with the sun gear, and a ring gear in meshing engagement with the star gears, the ring gear directly driving the shaft.

14. A gas turbine engine comprising:
a core air flowpath;
a shaft supporting a compressor section and a turbine section arranged within the core flowpath; and
wherein the turbine section includes a counter-rotating low pressure turbine comprising
an inner rotor directly driving the shaft, the inner rotor including an inner set of blades,
an outer rotor having an outer set of blades interspersed with the inner set of blades, the outer rotor configured to rotate in an opposite direction about the axis of rotation from the inner rotor, and
a gear system coupling the outer rotor to the shaft and configured to rotate the inner set of blades at a lower speed than the outer set of blades.

15. The gas turbine engine according to claim 14, wherein the compressor section includes a high pressure compressor section that has a pressure ratio of approximately 23:1.

16. The gas turbine engine according to claim 14, wherein the compressor section includes a counter-rotating low pressure compressor driven by the shaft.

17. The gas turbine engine according to claim 14, wherein the gear system is mounted to a turbine exhaust case.

18. The gas turbine engine according to claim 17, wherein the gear system includes a sun gear engaged to the outer rotor, a plurality of star gears in meshing engagement with the sun gear, and a ring gear in meshing engagement with the star gears.

19. The gas turbine engine according to claim 18, wherein the sun gear is fixed for rotation with an aft end of the outer rotor, the star gears are supported within a carrier that is fixed to the turbine exhaust case, and an aft end of the shaft includes a portion that extends radially outward from the axis to be coupled to the ring gear.

20. The gas turbine engine according to claim 14, including a first bearing supporting a fore end of the outer rotor for rotation relative to a mid-turbine frame structure, a second bearing supporting an aft end of the outer rotor for rotation relative to the shaft, and a third bearing supporting the shaft for rotation relative to the mid-turbine frame structure.

21. The gas turbine engine according to claim 20, wherein the first and third bearings are generally radially aligned with each other relative to the axis of rotation.

22. The gas turbine engine according to claim 20, wherein the first and third bearings are roller bearings and the second bearing is a ball bearing.

23. The gas turbine engine according to claim 14, wherein the gear system is positioned downstream of the inner and outer sets of blades.

24. The gas turbine engine according to claim 14, wherein the gear system includes a sun gear directly driven by the outer rotor, a plurality of star gears in meshing engagement with the sun gear, and a ring gear in meshing engagement with the star gears, the ring gear directly driving the shaft.

* * * * *